May 30, 1933.  F. A. SCHULTZE  1,911,535
ROTARY LAWN RAKE
Filed Jan. 26, 1931  2 Sheets-Sheet 1
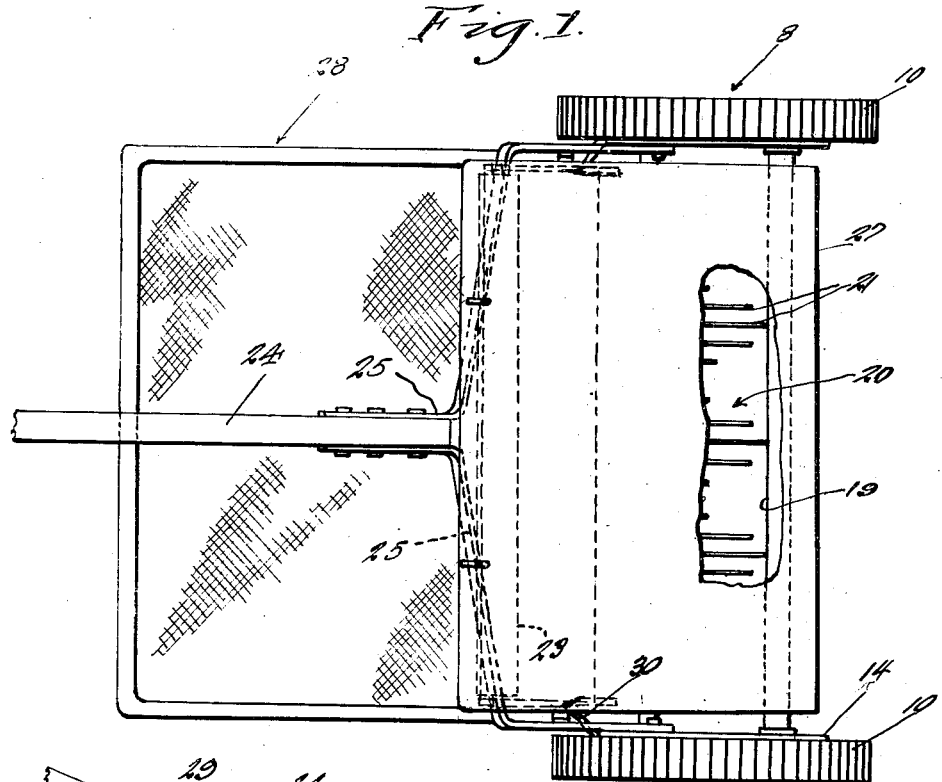
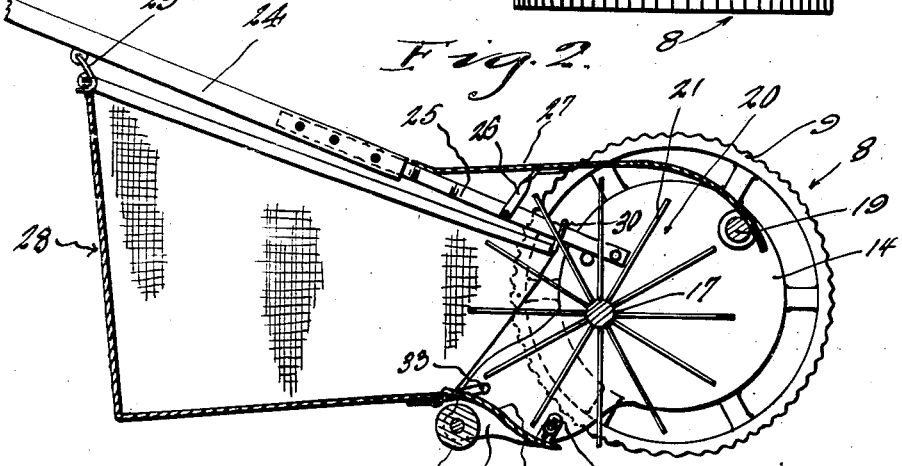
Inventor
Floyd A. Schultze
By Clarence A. O'Brien
Attorney May 30, 1933.  F. A. SCHULTZE  1,911,535
ROTARY LAWN RAKE
Filed Jan. 26, 1931  2 Sheets-Sheet 2
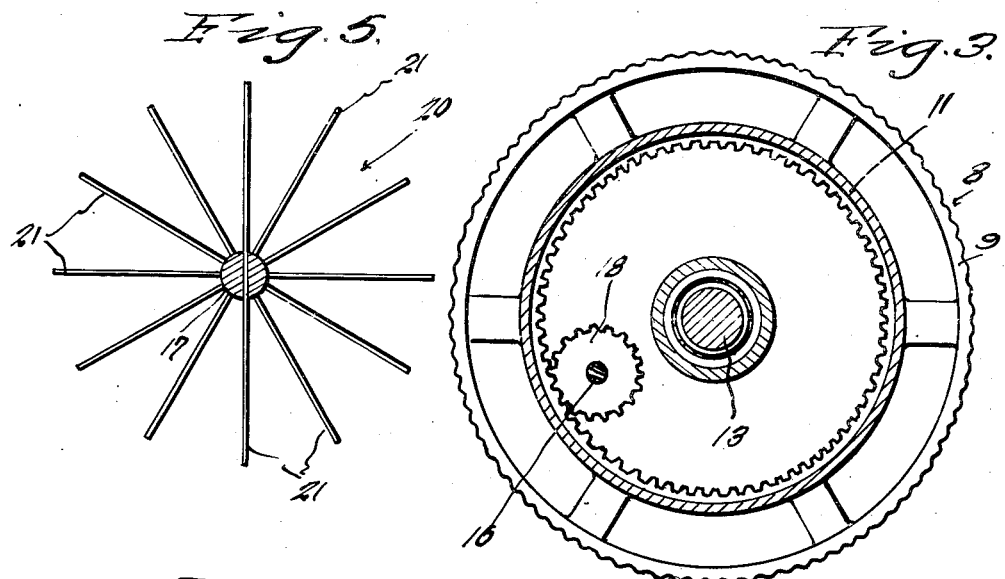
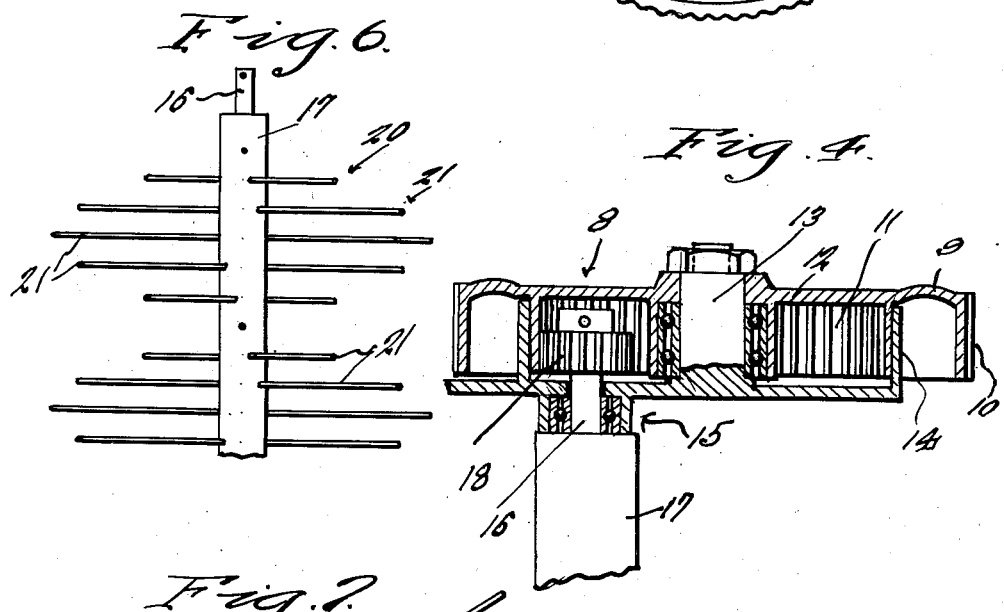
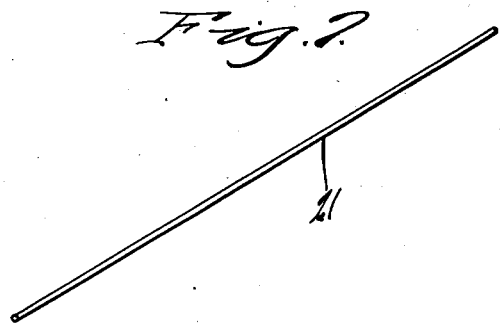
Inventor
Floyd A. Schultze
By Clarence A. O'Brien
Attorney Patented May 30, 1933

1,911,535

UNITED STATES PATENT OFFICE

FLOYD A. SCHULTZE, OF CHENOA, ILLINOIS

ROTARY LAWN RAKE

Application filed January 26, 1931. Serial No. 511,391.

This invention relates to improvements in rotary lawn rakes of the class which resembles and is operated similar to a lawn mower.

Briefly stated, the structure is distinguished by a wheel equipped frame having an operating handle structure and ground engaging wheels similar to the wheels used in present-day law mowers of the hand-propelled type. Carried by this frame is a tooth-equipped rotary rake actuated by direct gearing from the ground engaging wheels, a separable receptacle being associated with the handle structure for catching leaves, grass cuttings, and other refuse taken up by the rotary rake.

In carrying the inventive conception into practice, I have evolved and produced a novel structural arrangement of details forming a complete structure which, it is believed, constitutes a practical and structurally distinguishable contribution to the prior art.

The specific details and their particular association and arrangement will become more readily apparent from the following description and drawings. In the drawings:

Figure 1 is a top plan view of a structure developed in accordance with the present inventive conception.

Figure 2 is a central longitudinal sectional view through the structure seen in Figure 1.

Figure 3 is an enlarged sectional elevational view of one of the wheel assemblies.

Figure 4 is a horizontal sectional view through the structure seen in Figure 3.

Figure 5 is a sectional view through the rotary toothed rake.

Figure 6 is a top plan view of one end portion of the rake.

Figure 7 is a perspective view of one of the rake teeth.

The wheeled frame of one embodiment of the device of my invention comprises a pair of longitudinally spaced ground engaging wheels 8, each wheel including the wheel proper 9 provided with peripheral teeth 10, a concentric ring gear 11 and a central bearing structure 12 to accommodate the trunnion 13 carried by the relatively stationary drum unit 14. This drum unit it formed with an eccentric bearing 15 including a ball race to accommodate a reduced stub shaft 16 on the main rake shaft 17.

This stub shaft 16 is provided within the drum 14 with a pinion 18 whose teeth are meshed with the teeth of the ring gear 11. A reach rod 19 is connected with and extends between the companion drum elements 14, being attached eccentrically in a forward position adjacent the periphery of the drums as seen in Figure 2. The numeral 20 generally designates the rotary rake. This comprises the rotatable shaft 17 and the transverse teeth in the form of stiff rods 21 which are passed radially or diametrically through the shaft 17, the shaft being provided with openings which traverse it for this purpose. The teeth 21 are arranged in spiral relationship around the shaft and are relatively rigid.

The numerals 22 designate lateral and rearwardly extending brackets which carry the ground engaging anti-friction roller 23. The handle shown at 24 includes complemental sections 25 forming a yoke, the free ends of the arms of the sections being pivotally connected to the drum structures in a manner similar to that which usually obtains in lawn mower constructions.

Attached to these sections 25 by connecting elements 26 is a generally horizontal plate 27 having a forwardly downwardly curved portion forming a shield or guard over the rotary rake. The downwardly curved portion of the shield rests upon and overhangs the rod 19.

The numeral 28 designates generally the refuse collecting receptacle, which is in the nature of a canvas or metal basket of the configuration illustrated in Figures 1 and 2. A rear suspension and attaching hook 29 is adapted to be engaged with the handle 24 to suspend the rear of the receptacle and hooks 30 are provided on the forward and lower end of the receptacle to engage over the arms of the yoke elements or sections 25 to suspend the forward end of the receptacle in cooperative relation with the rotary rake so as to receive the debris raked thereby.

An apron indicated at 31 functions as a scoop for assisting the debris into the receptacle. This is adjustably connected as at 32 with the brackets 22. The forward edge of the scoop rides in close relationship to the ground and its rear edge extends partly into the front portion of the receptacle 28, where it is held in position by appropriate retaining hooks 33, carried by the forward edge portion of the receptacle.

The general appearance of the device of the invention is that of a hand lawn mower though it will usually be somewhat longer in transverse dimension than is the usual lawn mower so that it may have a greater coverage of area as it is pushed back and forth on the ground for accumulation of refuse. The device is to be operated exactly like a lawn mower. The rotation of the wheels 9 through the medium of the ring gear 11 and pinion 18 serves to rotate the rake shaft at the required speed for raking up the refuse and depositing it in the receptacle.

The spiral arrangement of the teeth on the rake shaft serves to pick up and rake and throw the refuse into the basket 28, the apron 31 functioning during the travel of the rake to scoop and guide the refuse to the basket.

It is obvious that the receptacle may be detached when filled and unloaded and emptied and quickly replaced.

It is evident that in carrying this invention into actual practice, I have developed a light weight durable machine of simple construction which will effectively clear the refuse from the lawn, the same being susceptible of easy manipulation and operation by ordinary persons, thus avoiding the necessity of providing skilled labor for the purpose.

It is further evident that the device operates in a manner similar to an ordinary lawn mower, and serves to quickly and conveniently clear the lawn of refuse. The spiral arrangement of the teeth of the rotary rake obviates the necessity of providing special means for cleaning the teeth. In fact, with this arrangement of rigid, spirally positioned teeth, the teeth are not subject to bending, and they operate to pick up the refuse and carry it into the receptacle continuously without clogging thereof.

The teeth of the rotary rake are spaced sufficiently to insure effective raking action and yet avoid a sweeping or brush action such as would have a tendency to fan away the light-weight leaves, thus leave the raked surface unclean. These and other advantages and features have doubtless been made apparent in the drawings, for which reason a more detailed explanation appears to be unnecessary.

I wish to emphasize, however, the mounting of the guard or shield 27 on the yoke portions of the handle and the resting of the curvate forward end thereof on the bar 19 whereby to insure clearance of the teeth from the shield. Then too, I wish to call attention to the fact that the holes through the rake shaft permit the use of relatively long rods to provide teeth on diametrically opposite sides of the shaft. This facilitates economical assembly and manufacture of the device.

It is thought that the description, taken in connection with the drawings, will enable a clear understanding of the invention to be had. Therefore, a more lengthy description is thought unnecessary.

While the preferred embodiment of the invention has been shown and described, it is to be understood that minor changes coming within the field of invention claimed may be resorted to in actual practice if desired, without departing from the spirit and scope of the appended claims.

I claim:

1. A rotary lawn rake construction of the type embodying a frame including a pair of transversely spaced companion drums, a spacing and connecting rod arranged therebetween and eccentrically located, wheels mounted for rotation on said drums, each wheel including a ring gear, an eccentric rake finger equipped shaft supported from the drums and provided on its ends with pinions in mesh with the ring gears, a handle including complemental members constituting a yoke, said members being swingably connected with said drums, a substantially horizontal guard plate attached to said yoke members and having a downwardly curvate end portion resting on said connecting rod, a bracket carried by an intermediate portion of each of said members for attaching said guard plate, a refuse collecting basket, hooks on its forward end detachably engageable with said yoke members, and hook means on said handle adjacent the rear end of the basket for supporting the same, said guard plate having its rear end spaced above the front portion of the basket, said rake finger equipped shaft comprising a cylinder fitted with a plurality of elongated rods projected therefrom at circumferentially and longitudinally spaced intervals, so that a line drawn through the radially outward ends of the rods describes a spiral, a bracket on each ground, and a drum engaging guide roller carried by said bracket, for facilitating the proper angle of application of the rake to the ground.

2. A rotary lawn rake having a pair of spaced drums connected by a spacer bar, a wheel carried by each drum, together with a rotary rake carried by the drums and operatively connected with the wheels, a downwardly and rearwardly extending bracket on each drum, a roller journaled between the brackets, a rockably adjustable scoop carried by and adjustably connected to the brackets, an operating handle secured to the drums, a refuse receptacle suspended from the handle and connected to the brackets so as to have its lower edge directly under the rear edge of the scoop, a connection between the scoop and the receptacle, said scoop being positioned beneath and to the rear of the rotary rake and close to the ground so as to deflect refuse raked by the rake into the refuse receptacle, said rotary rake comprising a relatively small cylindrical body provided with a multiplicity of small transverse passages therethrough and rotatably supported at its ends on the drums, a thin rod in each of said passages and extending equally from either side of the cylindrical body, said passages being arranged in longitudinally spaced spiralling manner, and a stub-shaft at each end of the said body for journalling in said drums, a pinion on each stub shaft within its companion drum, a ring gear carried by each drum for operating with the pinion.

In testimony whereof I affix my signature.

FLOYD A. SCHULTZE.